United States Patent
Chu

(10) Patent No.: US 10,845,806 B2
(45) Date of Patent: Nov. 24, 2020

(54) AUTONOMOUS VEHICLE CONTROL USING PRIOR RADAR SPACE MAP

(71) Applicant: GM GLOBAL TECHNOLOGY OPERATIONS LLC, Detroit, MI (US)

(72) Inventor: Kevin Chu, San Mateo, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 144 days.

(21) Appl. No.: 16/050,663

(22) Filed: Jul. 31, 2018

(65) Prior Publication Data

US 2020/0042001 A1 Feb. 6, 2020

(51) Int. Cl.
*G05D 1/00* (2006.01)
*G01S 13/86* (2006.01)
(Continued)

(52) U.S. Cl.
CPC .......... *G05D 1/0088* (2013.01); *G01S 13/865* (2013.01); *G01S 13/867* (2013.01); *G01S 13/89* (2013.01); *G05D 1/0231* (2013.01); *G05D 1/0257* (2013.01); *B60W 10/06* (2013.01); *B60W 10/18* (2013.01); *B60W 10/20* (2013.01); *G05D 2201/0213* (2013.01)

(58) Field of Classification Search
CPC .. G05D 1/0088; G05D 1/0231; G05D 1/0257; G05D 2201/0213; G01S 13/865; G01S 13/89; G01S 13/867; B60W 10/06; B60W 10/18; B60W 10/20

See application file for complete search history.

(56) References Cited

U.S. PATENT DOCUMENTS

| 2014/0006334 A1* | 1/2014 | Doria | G06N 20/00 706/52 |
| 2017/0068859 A1* | 3/2017 | Qian | G06K 9/6215 |

(Continued)

FOREIGN PATENT DOCUMENTS

EP  1736797 B1 *  4/2008  .......... B60W 40/076

OTHER PUBLICATIONS

Translation of Schwindt Oliver (Year: 2008).*
(Continued)

*Primary Examiner* — Navid Ziaeianmehdizadeh
(74) *Attorney, Agent, or Firm* — Medley, Behrens & Lewis, LLC

(57) ABSTRACT

Various technologies described herein pertain to controlling an autonomous vehicle to suppress data corresponding to predefined static objects in a radar output generated by a radar sensor system. A computing system of the autonomous vehicle retrieves prior data for a geographic location from a prior radar space map. The prior radar space map includes prior data for geographic locations in an environment corresponding to whether predefined static objects to be suppressed in radar outputs are located at the geographic locations. The computing system generates a score representative of a likelihood of a tracked object being at the geographic location based on data from the radar output for the geographic location, data from an output of a second sensor system for the geographic location, and the prior data for the geographic location from the prior radar space map. An engine, braking system, and/or steering system are controlled based on the score.

20 Claims, 9 Drawing Sheets

(51) Int. Cl.
  *G01S 13/89*   (2006.01)
  *G05D 1/02*   (2020.01)
  *B60W 10/06*   (2006.01)
  *B60W 10/18*   (2012.01)
  *B60W 10/20*   (2006.01)

(56) References Cited

U.S. PATENT DOCUMENTS

| | | |
|---|---|---|
| 2017/0123429 A1 | 5/2017 | Levinson et al. |
| 2017/0140245 A1 | 5/2017 | Kraft et al. |
| 2017/0248688 A1 | 8/2017 | Campbell et al. |
| 2017/0315229 A1 | 11/2017 | Pavek et al. |
| 2018/0059231 A1 | 3/2018 | Dewberry et al. |
| 2018/0120842 A1* | 5/2018 | Smith .................. G01S 13/867 |
| 2019/0258878 A1* | 8/2019 | Koivisto ................ G05D 1/00 |

OTHER PUBLICATIONS

"International Search Report for PCT Patent Application No. PCT/US2019/044253", dated Oct. 22, 2019, 6 pages.
"Written Opinion of the International Searching Authority for PCT Patent Application No. PCT/US2019/044253", dated Oct. 22, 2019, 11 Pages.
Sivaraman, et al., "Looking at Vehicles on the Road: A Survey of Vision-Based Vehicle Detection, Tracking, and Behavior Analysis", IEEE Transactions on Intelligent Transportation Systems, vol. 14, No. 4, Dec. 1, 2013, 24 Pages.

* cited by examiner

AUTONOMOUS VEHICLE CONTROL USING PRIOR RADAR SPACE MAP

BACKGROUND

An autonomous vehicle is a motorized vehicle that can operate without human conduction. An exemplary autonomous vehicle includes a plurality of sensor systems, such as but not limited to, a radar sensor system, a lidar sensor system, and an image (camera) sensor system, amongst others. The autonomous vehicle operates based upon sensor signals output by the sensor systems.

When operating in an environment, certain objects in the environment may cause one or more of the sensor systems of an autonomous vehicle to generate outputs that include false positive data. The false positive data can detrimentally impact conventional operation of an autonomous vehicle by causing the autonomous vehicle to unnecessarily stop for or maneuver around certain types of objects. For instance, the types of objects that cause inclusion of false positive data in the generated outputs of sensor systems can be part of a roadway over which an autonomous vehicle drives or part of an overhanging structure under which an autonomous vehicle drives; in either case, it is desirable that an autonomous vehicle need not change behavior due to existence of these types of objects in the environment.

By way of illustration, various metallic objects can be in an environment in which an autonomous vehicle operates. These metallic objects can be located at fixed geographic locations (e.g., the metallic objects are not moving over time, and thus, are static). Moreover, the metallic objects may be at geographic locations in a path of an autonomous vehicle; yet, due to the nature of the metallic objects as well as the position of the metallic objects, the autonomous vehicle may drive over or under the metallic objects without the metallic objects being impediments along the path traversed by the autonomous vehicle. Further, the static, metallic objects can strongly reflect radar signals. Accordingly, a radar sensor system of an autonomous vehicle can generate a radar output that includes data corresponding to the relatively strong reflected signals from the static, metallic objects in the environment. Thus, in operation, radar outputs that include data corresponding to at least some of these static, metallic objects can detrimentally impact performance of the autonomous vehicle. Examples of the static, metallic objects include manhole covers, metallic plates, metallic grates, supporting structures of bridge overpasses, and the like.

SUMMARY

The following is a brief summary of subject matter that is described in greater detail herein. This summary is not intended to be limiting as to the scope of the claims.

Described herein are various technologies that pertain to controlling an autonomous vehicle to suppress data corresponding to predefined static objects in a radar output generated by a radar sensor system. With more specificity, described herein are various technologies pertaining to utilizing a prior radar space map that includes prior data for geographic locations in an environment corresponding to whether predefined static objects to be suppressed in radar outputs are located at the geographic locations. Accordingly, prior data for a geographic location in an environment can be retrieved and utilized by the autonomous vehicle when generating a score representative of a likelihood of a tracked object being at a geographic location. Moreover, pursuant to various embodiments, described herein are various techniques for controlling behavior of the autonomous vehicle based on the prior data for geographic locations corresponding to the predefined static objects in the prior radar space map. The predefined static objects in the environment can cause blind spots for the radar sensor systems (e.g., linear phase array radar sensor systems) by occluding portions of fields of view of the radar sensor systems. Thus, movement of the autonomous vehicle can be controlled based on the prior data from the prior radar space map to position the autonomous vehicle to enable an otherwise occluded portion of a field of view of to be viewable by the radar sensor system.

According to various embodiments, an autonomous vehicle includes an engine, a braking system, a steering system, a radar sensor system, and at least a second sensor system. The radar sensor system generates a radar output. Moreover, the second sensor system, which is a differing type of sensor system as compared to the radar sensor system, generates a second output. For instance, the second sensor system can be a lidar sensor system, an image sensor system, or the like. The autonomous vehicle also includes a computing system that is in communication with the engine, the braking system, the steering system, and the sensor systems. The computing system can retrieve prior data for a geographic location in an environment from a prior radar space map. The prior radar space map includes prior data for geographic locations in the environment corresponding to whether predefined static objects to be suppressed in radar outputs are located at the geographic locations. Further, the computing system can generate a score representative of a likelihood of a tracked object being at the geographic location. The score can be generated based on data from the radar output for the geographic location, data from the second output for the geographic location, and the prior data for the geographic location from the prior radar space map. Moreover, the engine, the braking system, and/or the steering system can be controlled based on the score representative of the likelihood of the tracked object being at the geographic location.

Pursuant to various embodiments, the computing system of the autonomous vehicle can detect a static object at a geographic location in the environment based on data from the radar output for the geographic location, where the radar output is generated by the radar sensor system of the autonomous vehicle. A portion of a field of view of the radar sensor system beyond the geographic location from a perspective of the radar sensor system can be occluded due to the static object. Moreover, prior data for the geographic location can be retrieved by the computing system from a prior radar space map. Based on the prior data for the geographic location from the prior space map, the computing system can identify that the static object at the geographic location is a predefined static object to be suppressed in the radar outputs. For instance, the computing system can identify that the static object is a manhole cover, a metallic grate, a metallic plate, a supporting structure for of a bridge overpass, or the like. Accordingly, the engine of the autonomous vehicle, the braking system of the autonomous vehicle, and/or the steering system of the autonomous vehicle can be controlled based on the predefined static object to be suppressed being identified as being at the geographic location (e.g., reposition the autonomous vehicle to make the previously occluded portion of the field of view of the radar sensor system viewable).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
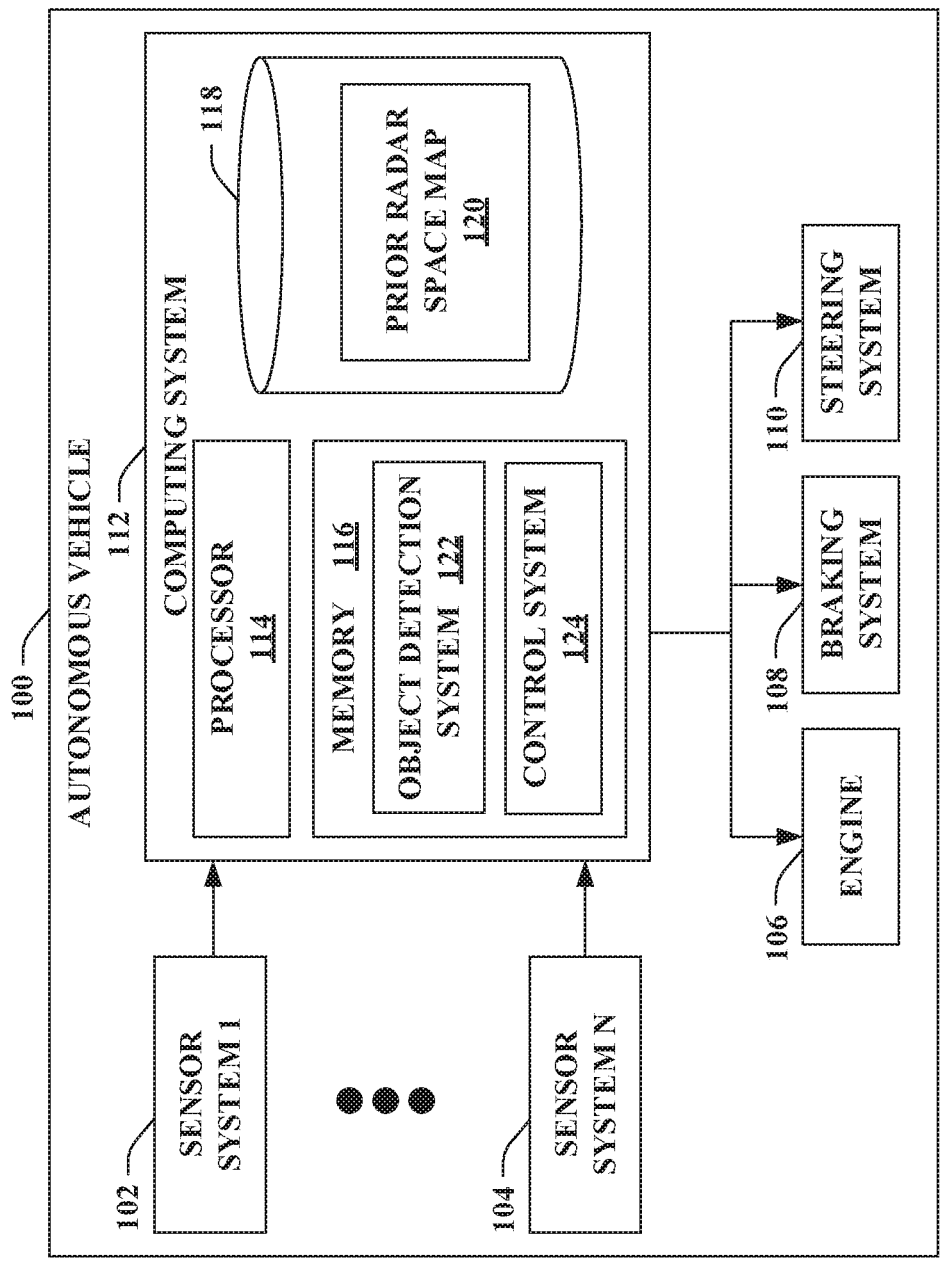
FIG. 1 illustrates a functional block diagram of an exemplary autonomous vehicle.

Various technologies pertaining to controlling an autonomous vehicle to suppress data corresponding to predefined static objects in radar outputs generated by a radar sensor system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Referring now to the drawings, FIG. 1 illustrates an autonomous vehicle 100. The autonomous vehicle 100 can navigate about roadways without human conduction based upon sensor signals outputted by sensor systems of the autonomous vehicle 100. The autonomous vehicle 100 includes a plurality of sensor systems, namely, a sensor system 1 102, . . . , and a sensor system N 104, where N can be substantially any integer greater than one (collectively referred to herein as sensor systems 102-104). The sensor systems 102-104 are of different types and are arranged about the autonomous vehicle 100. For example, the sensor system 1 102 may be a radar sensor system and the sensor system N 104 may be an image (camera) sensor system. Other exemplary sensor systems included in the sensor systems 102-104 can include lidar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, an engine 106, a braking system 108, and a steering system 110. The engine 106 may be an electric engine or a combustion engine. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally includes a computing system 112 that is in communication with the sensor systems 102-104, the engine 106, the braking system 108, and the steering system 110. The computing system 112 includes a processor 114 and memory 116; the memory 116 includes computer-executable instructions that are executed by the processor 114. Pursuant to various examples, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The computing system 112 can further include a data store 118. The data store 118 includes a prior radar space map 120 that includes prior data for geographic locations in an environment corresponding to whether predefined static objects to be suppressed in radar outputs are located at the geographic locations. The predefined static objects to be suppressed in the radar outputs can reflect radar signals. Moreover, the predefined static objects to be suppressed in the radar outputs may be at geographic locations that are in paths of autonomous vehicles. However, due to the nature and positions of the predefined static objects, autonomous vehicles may drive over or under the predefined static objects without the predefined static objects being impediments along the paths traversed by the autonomous vehicles. For instance, the predefined static objects to be suppressed can include various metallic objects, which can reflect radar signals. Examples of the predefined static objects to be suppressed in the radar outputs can include manhole covers, metallic plates, metallic grates, supporting structures of bridge overpasses, and the like. Thus, if not suppressed, data in radar outputs corresponding to the predefined static objects can yield false positive results, which can detrimentally impact operation of the autonomous vehicle 100. By way of illustration, if radar data corresponding to a manhole cover is not suppressed, the computing system 112 can improperly interpret the manhole cover as a car; thus, the autonomous vehicle 100 may be controlled to stop due to incorrectly equating the radar data corresponding to the manhole cover as a car.

While many of the examples set forth herein describe the data store 118 of the autonomous vehicle 100 including the prior radar space map 120, it is contemplated that a data store of a remote computing system (not shown) can additionally or alternatively include the prior radar space map 120. Pursuant to another example, it is to be appreciated that the data store 118 of the autonomous vehicle 100 can include a portion of the prior radar space map 120 (e.g., the autonomous vehicle 100 can receive the portion of the prior radar space map 120 from the remote computing system). The prior radar space map 120 can be generated by collecting radar outputs in the environment over time, and identifying the predefined static object that are to be suppressed in the radar outputs. Moreover, according to various examples, it is contemplated that the prior radar space map 120 can be utilized to localize the autonomous vehicle 100 (e.g., based on radar output generated by a radar sensor system).

The memory 116 of the computing system 112 includes an object detection system 122 that is configured to generate a score representative of a likelihood of a tracked object being at a geographic location in an environment. The object detection system 122 can retrieve prior data for the geographic location in the environment from the radar space map 120. Moreover, the object detection system 122 can generate the score representative of the likelihood of the tracked object being at the geographic location based at least in part on the prior data for the geographic location retrieved from the prior radar space map 120, as will be described in greater detail below. Thus, if a predefined static object to be suppressed in radar outputs is identified as being at the geographic location (e.g., as specified in the prior radar space map 120), then the prior data for the geographic location can aid in suppressing the data from the radar output for the geographic location (which represents the relatively strong reflected signal attributable to the predefined static object at the geographic location).

The memory 116 additionally includes a control system 124. The control system 124 is configured to control at least one of the mechanical systems of the autonomous vehicle 100 (e.g., the engine 106, the braking system 108, and/or the steering system 110). The control system 124 can control the mechanical system(s) based upon the score representative of the likelihood of the tracked object being at the geographic location as determined by the object detection system 122.

Exemplary operation of the autonomous vehicle 100 is now set forth. A radar sensor system (e.g., the sensor system 1 102) can generate a radar output. Additionally, a second sensor system (e.g., the sensor system N 104), which is a differing type of sensor system as compared to the radar sensor system, can generate a second output. The second sensor system, for instance, can be an image sensor system or a lidar sensor system. The object detection system 122 can retrieve prior data for a geographic location in an environment from the prior radar space map 120. Moreover, the object detection system 122 can generate a score representative of a likelihood of a tracked object being at the geographic location based on data from the radar output for the geographic location, data from the second output for the geographic location, and the prior data for the geographic location. Further, the control system 124 can control the mechanical system(s) based upon the score representative of the likelihood of the tracked object being at the geographic location.

According to various examples, it is to be appreciated that a third sensor system (e.g., one of the sensor systems 102-104) can generate a third output. The third sensor system again can be a differing type of sensor system as compared to the radar sensor system and the second sensor system. Moreover, the object detection system 122 can generate the score representative of the likelihood of the tracked object being at the geographic location further based on data from the third output for the geographic location. Pursuant to an illustration, the radar sensor system can generate a radar output, a lidar sensor system can generate a lidar output, and an image sensor system can generate an image output. Following this illustration, the object detection system 122 can generate a score representative of a likelihood of a tracked object being at a geographic location based on data from the radar output for the geographic location, data from the lidar output for the geographic location, data from the image output for the geographic location, and prior data for the geographic location retrieved from the prior radar space map 120.

According to various examples, a tracked object to be detected by the object detection system 122 can be a car, a truck, or a bus; however, the claimed subject matter is not so limited. Moreover, the object detection system 122 desirably ignores (or diminishes consideration of) data in a radar output corresponding to predefined static objects to be suppressed when generating a score representative of a likelihood of a tracked object being at a geographic location. However, in contrast to some conventional approaches that ignore data corresponding to all static objects in radar outputs, radar data corresponding to static objects other than the predefined static objects to be suppressed is utilized by the object detection system 122 to generate a score representative of a likelihood of a tracked object being at a geographic location. By way of illustration, if a parked car is at a particular geographic location, radar data from a radar output for the particular geographic location can be employed by the object detection system 122 to generate a score representative of the likelihood of a tracked object being at the particular geographic location (e.g., without suppression of such radar data, assuming that a predefined static object is not also positioned at the particular geographic location).

Figure 2:
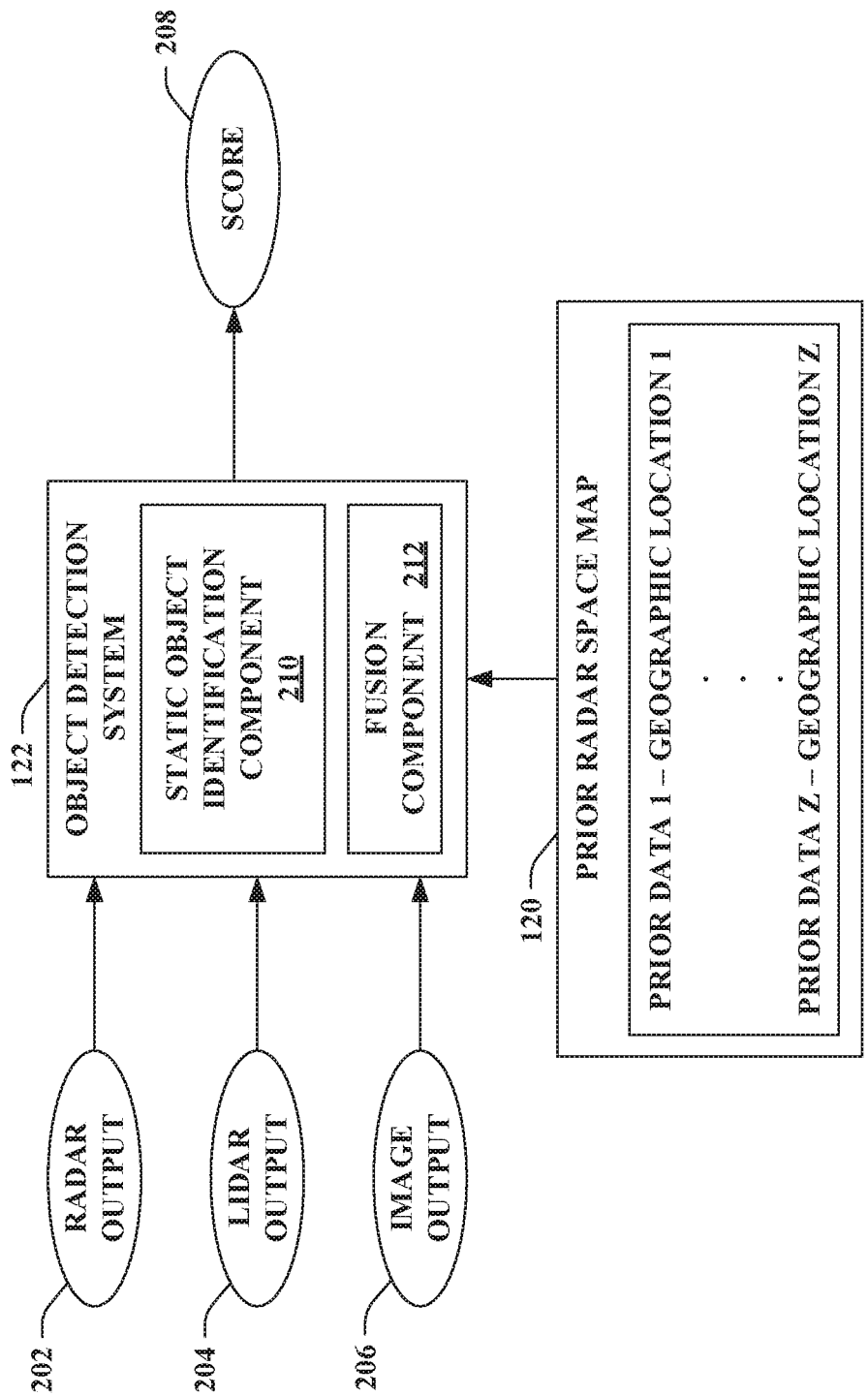
FIG. 2 illustrates an exemplary object detection system and prior radar space map of the autonomous vehicle of FIG. 1 in greater detail.

Now turning to FIG. 2, illustrated are the object detection system 122 and the prior radar space map 120 of the autonomous vehicle 100 in greater detail. As described above, the sensor systems 102-104 of the autonomous vehicle 100 can generate respective outputs. Thus, for instance, the object detection system 122 can receive radar output 202 generated by the radar sensor system of the autonomous vehicle 100, lidar output 204 generated by the lidar sensor system of the autonomous vehicle 100, and an image output 206 generated by the image sensor system of the autonomous vehicle 100. Moreover, as set forth above, the object detection system 122 can generate a score 208 representative of a likelihood of a tracked object being at a geographic location. The score 208 can be generated by the object detection system 122 based on the radar output 202, the lidar output 204, the image output 206, and prior data from the prior radar space map 120.

The object detection system 122 includes a static object identification component 210. The static object identification component 210 is configured to detect a static object at a geographic location based on data from the radar output 202 for a geographic location. By way of illustration, the static object identification component 210 can detect a static object at a geographic location based on Doppler shift data corresponding to the geographic location in the radar output 202. The Doppler shift data can be indicative of a relative velocity of the object relative to the autonomous vehicle 100. Accordingly, if the static object identification component 210 identifies that a detected object at a particular geographic location is not moving (e.g., the detected object is identified as having a velocity of zero, the detected object is identified as having a velocity below a threshold velocity), then the static object identified component 210 can deem the detected object to be a static object.

When the static object identification component 210 detects a static object at a geographic location, the object detection system 122 can retrieve prior data corresponding to the geographic location from the prior radar space map 120. The prior radar space map 120 may include prior data corresponding to the geographic location (if a predefined static object to be suppressed in radar outputs is located at the geographic location). Otherwise, if a predefined static object to be suppressed in radar outputs is not located at the geographic location, the prior radar space map 120 may lack prior data corresponding to the geographic location. According to another example, if a predefined static object to be suppressed in radar outputs is not located at the geographic location, the prior radar space map 120 may include prior data corresponding to the geographic location that does not cause radar data for such geographic location to be suppressed. Further, it is contemplated that when the static object identification component 210 does not detect a static object at a geographic location based on the data from the radar output 202 for the geographic location, the object detection system 122 need not retrieve prior data for the geographic location from the prior radar space map 120.

The object detection system 122 further includes a fusion component 212 configured to combine data from the sensor systems as well as prior data from the prior radar space map 120 (e.g., if retrieved and if the prior radar space map 120 includes corresponding prior data) to generate the score 208. According to an example, the fusion component 212 can be a Bayesian system that is utilized to generate the score 208.

According to an example, when the static object identification component 210 detects a static object at a geographic location, the object detection system 122 can retrieve prior data corresponding to the geographic location from the prior radar space map 120. Following this example, the fusion component 212 can generate the score 208 representative of a likelihood of a tracked object being at the geographic location based on data from the radar output 202 for the geographic location, data from the lidar output 204 for the geographic location, data from the image output 206 for the geographic location, and the prior data from the prior radar space map 120 corresponding to the geographic location.

Pursuant to another example, the static object identification component 210 does not detect a static object at a geographic location. Following this example, the fusion component 212 can generate the score 208 representative of the likelihood of a tracked object being at the geographic location based on data from the radar output 202 for the geographic location, data from the lidar output 204 for the geographic location, and data from the image output 206 for the geographic location (without prior data for the geographic location from the prior radar space map 120).

The following example is set forth for illustration purposes. It is contemplated that the score 208 representative of a likelihood of a tracked object being at a geographic location (e.g., probability of a car being at the geographic location) can be generated by the fusion component 212 as follows:

$$P(\text{car})=f(P(\text{radar}),P(\text{lidar}),P(\text{vision}))$$

Accordingly, the probably of a car being at the geographic location can be a function of a probability from the radar output 202 (P(radar)), a probability from the lidar output 204 (P(lidar)), and a probability from the image output 206 (P(vision)). When an object such as a manhole cover, a metallic plate, a metallic grate, or a supporting structure of a bridge overpass is at the geographic location, the probability from the radar output 202 (P(radar)) can be increased, which can cause a false positive detection of a car at the geographic location (e.g., P(car) can be increased). To handle such scenarios, some conventional approaches ignore the probability from the radar output 202 for static objects. However, with these traditional approaches, the probability from the radar output 202 for non-moving objects such as cars, trucks, or buses are not considered; instead, the data from the lidar output 204 and the data from the image output 206 are relied upon for these conventional techniques to detect the non-moving cars, trucks, buses, etc. In contrast, as set forth herein, prior data from the prior radar space map 120 is utilized to suppress predefined static objects in radar outputs; thus, the probability of the car being at the geographic location can further be computed by the fusion component 212 based on the prior data corresponding to the geographic location (e.g., P(radar) may be a function of the prior data corresponding to the geographic location, P(car) may further be a function of the prior data).

Figure 3:
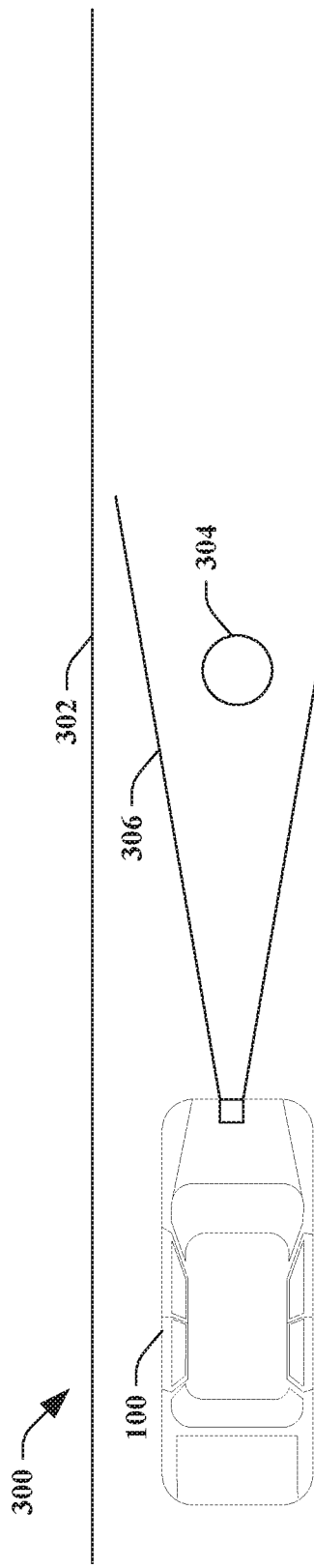
FIGS. 3-4 illustrate exemplary top views of the autonomous vehicle of FIG. 1.

Now turning to FIG. 3, illustrated is a top view 300 of the autonomous vehicle 100 that is traveling on a road 302. The road 302 includes a manhole cover 302 at a particular geographic location. As depicted, the manhole cover 302 can be within a field of view 306 of the radar sensor system of the autonomous vehicle 100. Radar output generated by the radar sensor system can include data corresponding to the manhole cover 302 at the particular geographic location. According to the techniques described herein, it can be desirable to suppress the data corresponding to the manhole cover 302 at the particular geographic location in the radar output when determining a score representative of a likelihood of a tracked object being at the particular geographic location. Thus, assuming that the prior radar space map 120 includes prior data corresponding to the manhole cover 302 at the particular geographic location, the prior data can be utilized to suppress the data corresponding to the manhole cover 302 at the particular geographic location when generating the score (e.g., which can decrease the likelihood of the manhole cover 304 improperly being interpreted as a car). By using the prior data corresponding to the manhole cover 302 at the particular geographic location to generate the score representative of the likelihood of the tracked object being at the particular geographic location, the autonomous vehicle 100 need not be controlled to unnecessarily stop or maneuver around the manhole cover 304 on the road 302.

Figure 4:
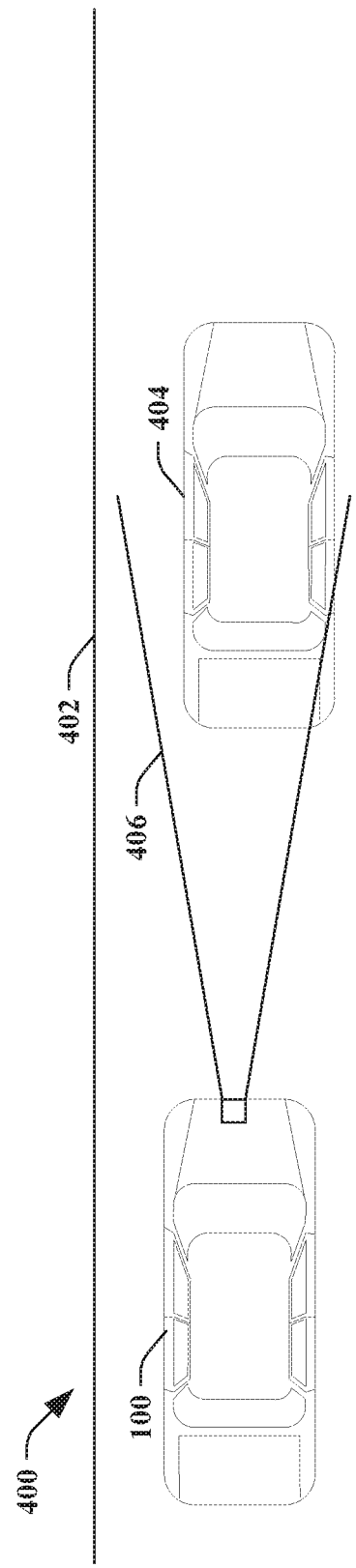

With reference to FIG. 4, illustrated is another top view 400 of the autonomous vehicle 100 that is traveling on a road 402. As depicted, a non-moving car 404 is at a particular geographic location, which is within a field of view 406 of the radar sensor system of the autonomous vehicle 100 (e.g., the car 404 can be parked or otherwise stopped at the particular geographic location). Radar output generated by the radar sensor system can include data corresponding to the non-moving car 404 at the particular geographic location.

According to an example, a predefined static object to be suppressed in radar outputs is not also positioned at the particular geographic location at which the car 404 is positioned. Following this example, data from the radar output corresponding to the car 404 at the particular geographic location is used to generate a score representative of a likelihood of a tracked object being at the particular geographic location. For instance, it is contemplated that the prior radar space map 120 may lack prior data corresponding to the particular geographic location due to a predefined static object to be suppressed in radar outputs not being located at the particular geographic location. Pursuant to another illustration, prior data corresponding to the particular geographic location can be retrieved from the prior radar space map 120; however, the retrieved prior data corresponding to the particular geographic location may not suppress the data from the radar output corresponding to the car 404 at the particular geographic location due to a predefined static object to be suppressed in radar outputs not being located at the particular geographic location.

In accordance with another example, a predefined static object to be suppressed in radar outputs is positioned at the particular geographic location at which the car 404 is positioned. Pursuant to this example, data from the radar outputs corresponding to the car 404 (as well as the predefined static object such as a manhole cover as in the example of FIG. 3) is suppressed when determining a score representative of a likelihood of a tracked object being at the particular geographic location (e.g., the prior data corresponding to the predefined static object to be suppressed at the particular geographic location is used to suppress the predefined static object). Accordingly, data from the other sensor systems (e.g., data from the lidar sensor system and/or data from the image sensor system) can be utilized to detect the non-moving car 404 at the particular geographic location.

Figure 5:
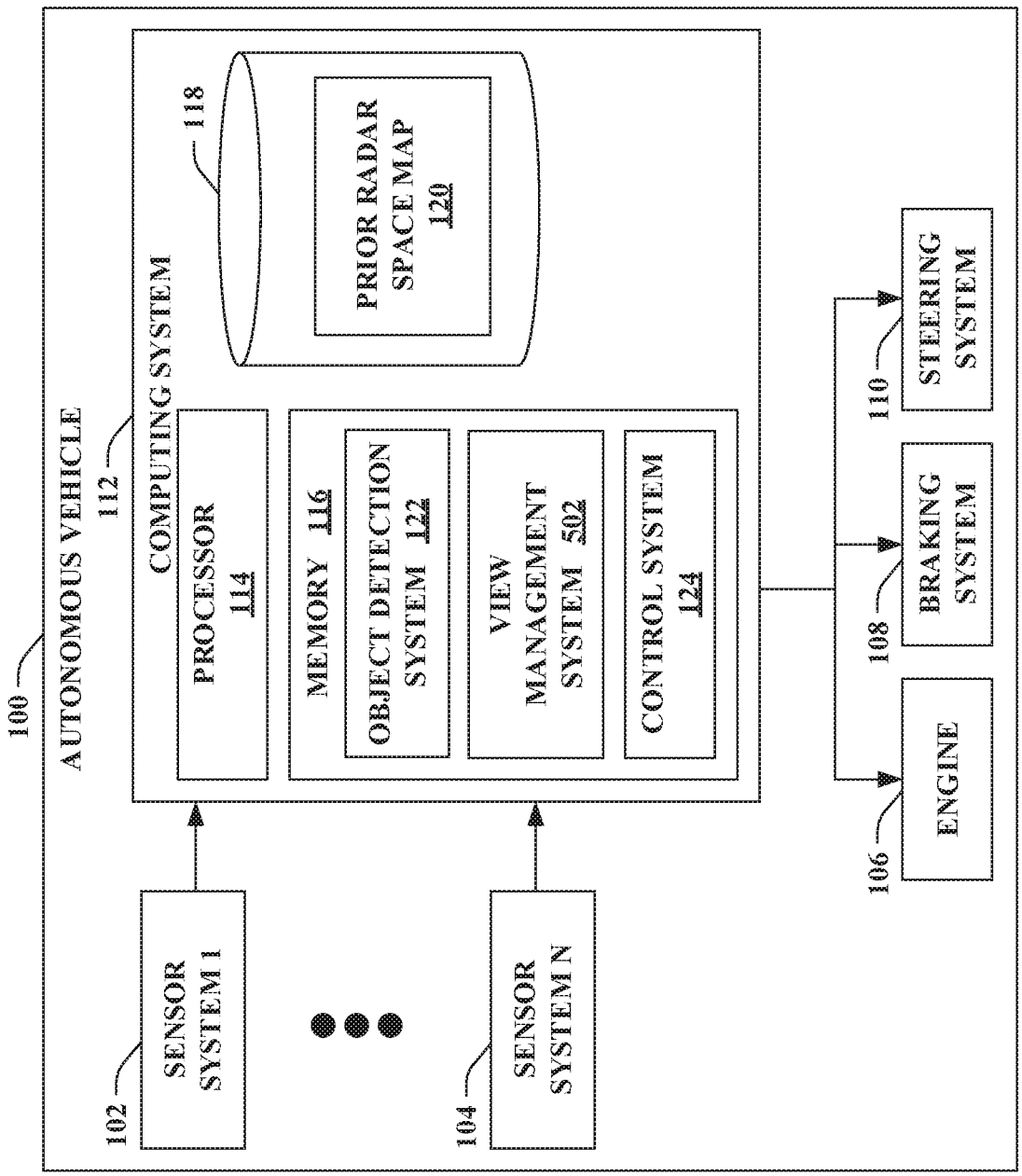
FIG. 5 illustrates another functional block diagram of the exemplary autonomous vehicle.

With reference to FIG. 5, illustrated is another exemplary embodiment of the autonomous vehicle 100. The autonomous vehicle 100 includes the sensor systems 102-104, the mechanical systems (e.g., the engine 106, the braking system 108, and the steering system 110) and the computing system 112 as described above. Again, the memory 116 of the computing system 112 can include the object detection system 122 and the control system 124. Moreover, the memory 116 can include a view management system 502 configured to control a position of the autonomous vehicle 110 based on prior data for geographic locations in the prior radar space map 120.

Radar output generated by a radar sensor system (e.g., one of the sensor systems 102-104) can be received. As described above, the object detection system 122 (e.g., the static object identification component 210) can detect a static object at a geographic location in an environment based on data from the radar output for the geographic location. Moreover, a portion of the field of view of the radar sensor system beyond the geographic location from a perspective of the radar sensor system can be occluded due to the static object. For instance, such occlusion can result from use of a linear phase array radar sensor system (e.g., a one-dimensional phase array radar sensor system); by way of illustration, a two-dimensional phase array radar sensor system may not similarly encounter occlusion. The view management system 502 can retrieve prior data for the geographic location from the prior radar space map 120. Further, the view management system 502 can identify, based on the prior data for the geographic location from the prior radar space map 120, that the static object at the geographic location is a predefined static object to be suppressed in the radar outputs. The view management system 502 can further identify that the static object at the geographic location is the predefined static object to be suppressed in the radar outputs based on a score (e.g., the score 208) representative of a likelihood of a tracked object being at the geographic location generated by the object detection system 122. The view management component 502 can further cause the control system 124 to control at least one of the engine 106, the braking system 108, or the steering system 110 of the autonomous vehicle 100 based on the predefined static object to be suppressed being at the geographic location.

According to an illustration, the view management component 502 can cause the control system 124 to control the engine 106, the braking system 108, and/or the steering system 110 to reposition the autonomous vehicle 100 based on occlusion in the field of view of the radar sensor system caused by the predefined static object to be suppressed. Additionally or alternatively, the view management system 502 can cause the control system 124 to control the engine 106, the braking system 108 and/or the steering system 110 to reposition the autonomous vehicle 100 such that the predefined static object to be suppressed at the geographic location is removed from the field of view of the radar sensor system. Accordingly, the view management system 502 can provide output to the control system 124 to control the engine 106, the braking system 108, and/or the steering system 110.

Figure 6:
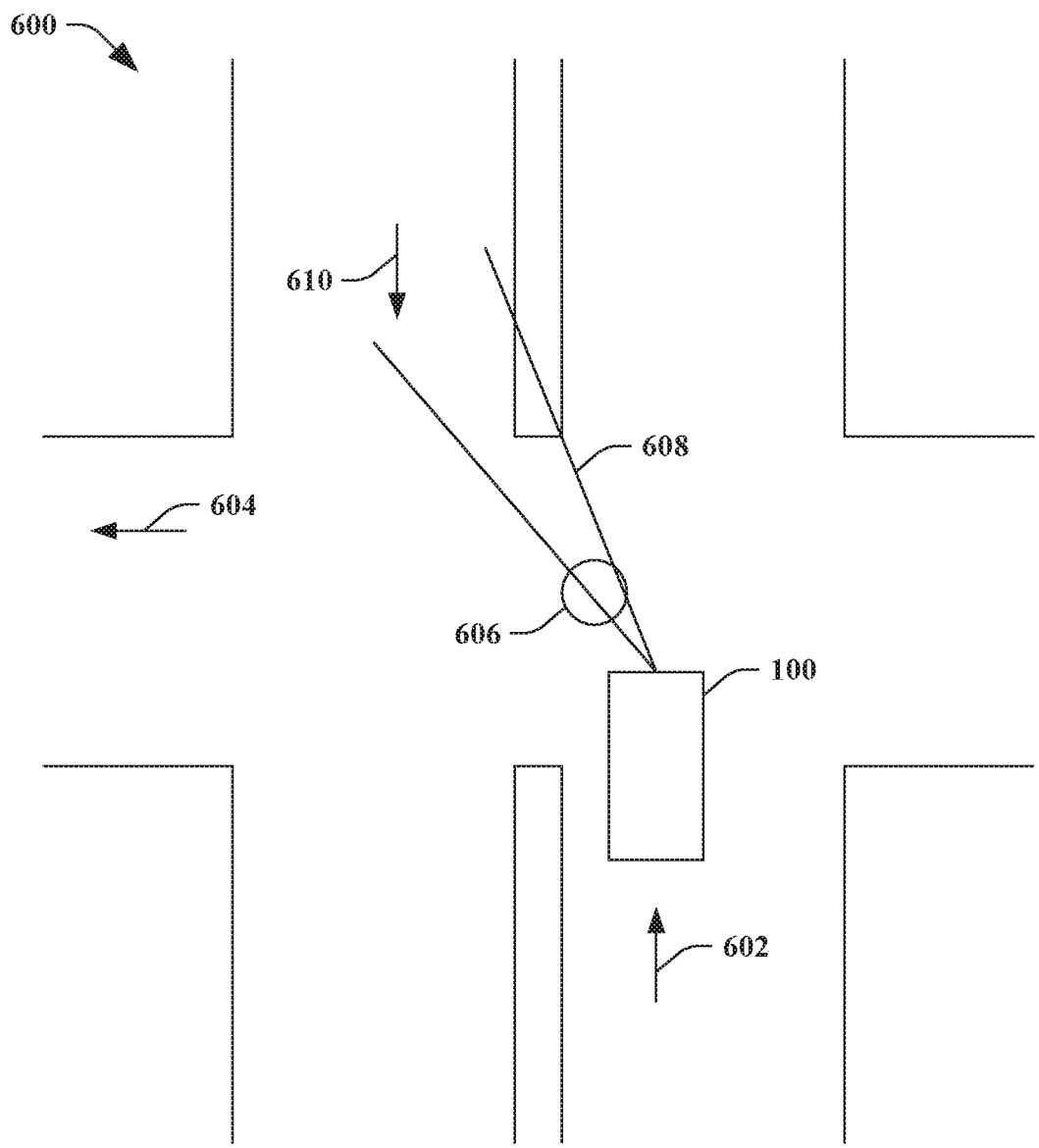
FIGS. 6-7 illustrate top views of an exemplary intersection.

With reference to FIG. 6, illustrated is a top view of an intersection 600. The autonomous vehicle 100 approaches the intersection 600 in a direction represented by an arrow 602. Moreover, the autonomous vehicle 100 will be turning left so as to travel in a direction represented by an arrow 604. Moreover, a manhole cover 606 is positioned in the intersection 600. When the autonomous vehicle 100 is at the position depicted in FIG. 6, the manhole cover 606 can occlude a portion of a field of view 608 of a radar sensor system of the autonomous vehicle 100 beyond the geographic location of the manhole cover 606 from a perspective of the radar sensor system. Thus, the radar sensor system of the autonomous vehicle 100 can have a blind spot beyond the geographic location of the manhole cover 606; accordingly, the radar sensor system may be unable to be used to detect oncoming cars traveling in a direction represented by an arrow 610 when at the position depicted in FIG. 6.

Figure 7:
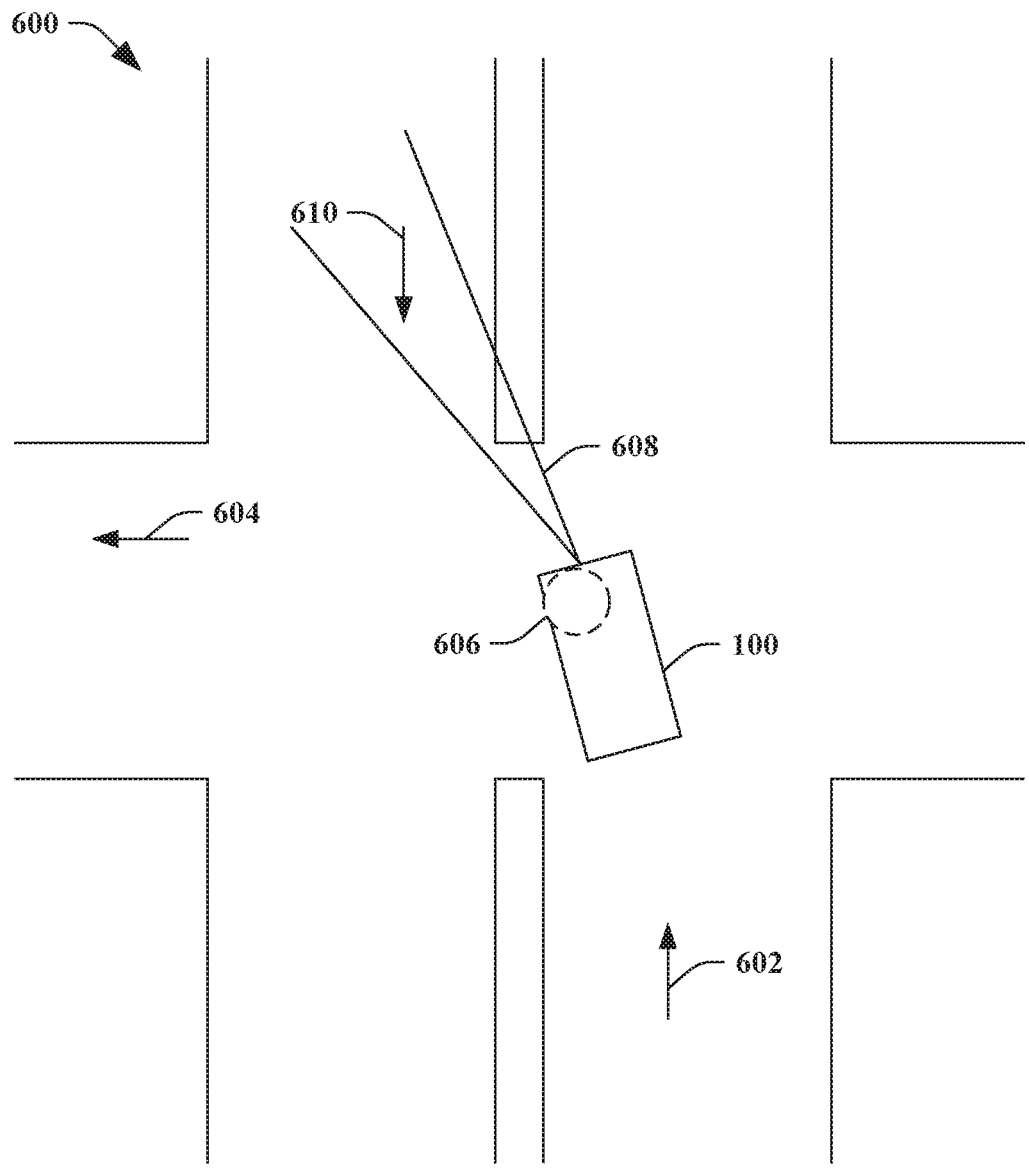

Turning to FIG. 7, illustrated is another top view of the intersection 600. The autonomous vehicle 100 can be controlled to move based on prior data for the geographic location from the prior radar space map 120. In particular, based on the prior data for the geographic location corresponding to the manhole cover 606 to be suppressed in radar outputs, the autonomous vehicle 100 can be controlled to move. The autonomous vehicle 100 can be controlled to be repositioned based on the occlusion in the field of view 608 of the radar sensor system caused by the manhole cover 608. For instance, as depicted, the autonomous vehicle 100 can be controlled to be repositioned such that the manhole cover 606 at the geographic location is removed from the field of view 608 of the radar sensor system. Thus, when in the position shown in FIG. 7, the radar sensor system of the autonomous vehicle 100 can be used to detect oncoming cars traveling in the direction represented by the arrow 610.

Figure 8:
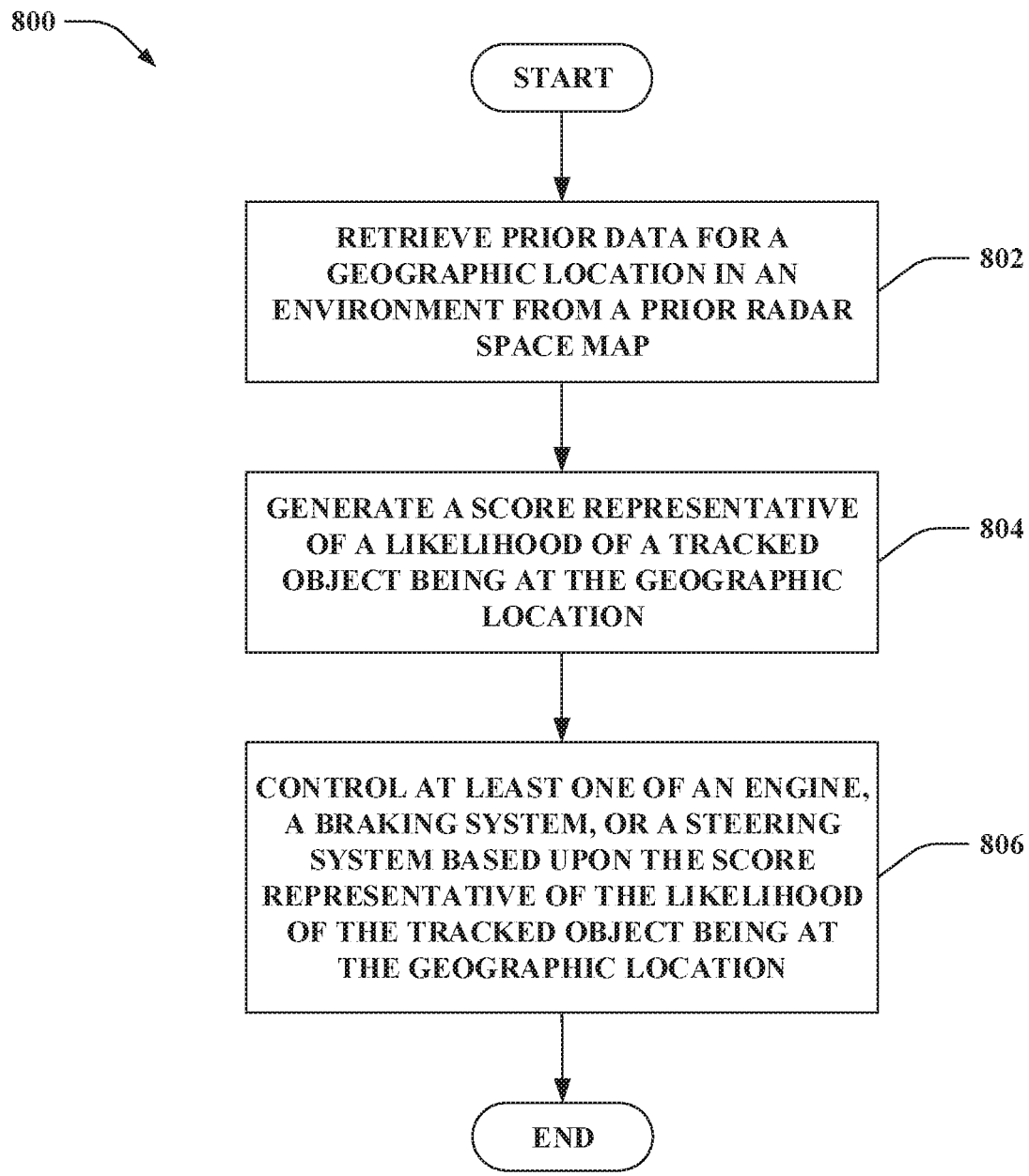
FIG. 8 is a flow diagram that illustrates an exemplary methodology for controlling an autonomous vehicle to suppress data corresponding to predefined static objects in radar outputs generated by a radar sensor system of the autonomous vehicle.
Figure 9:
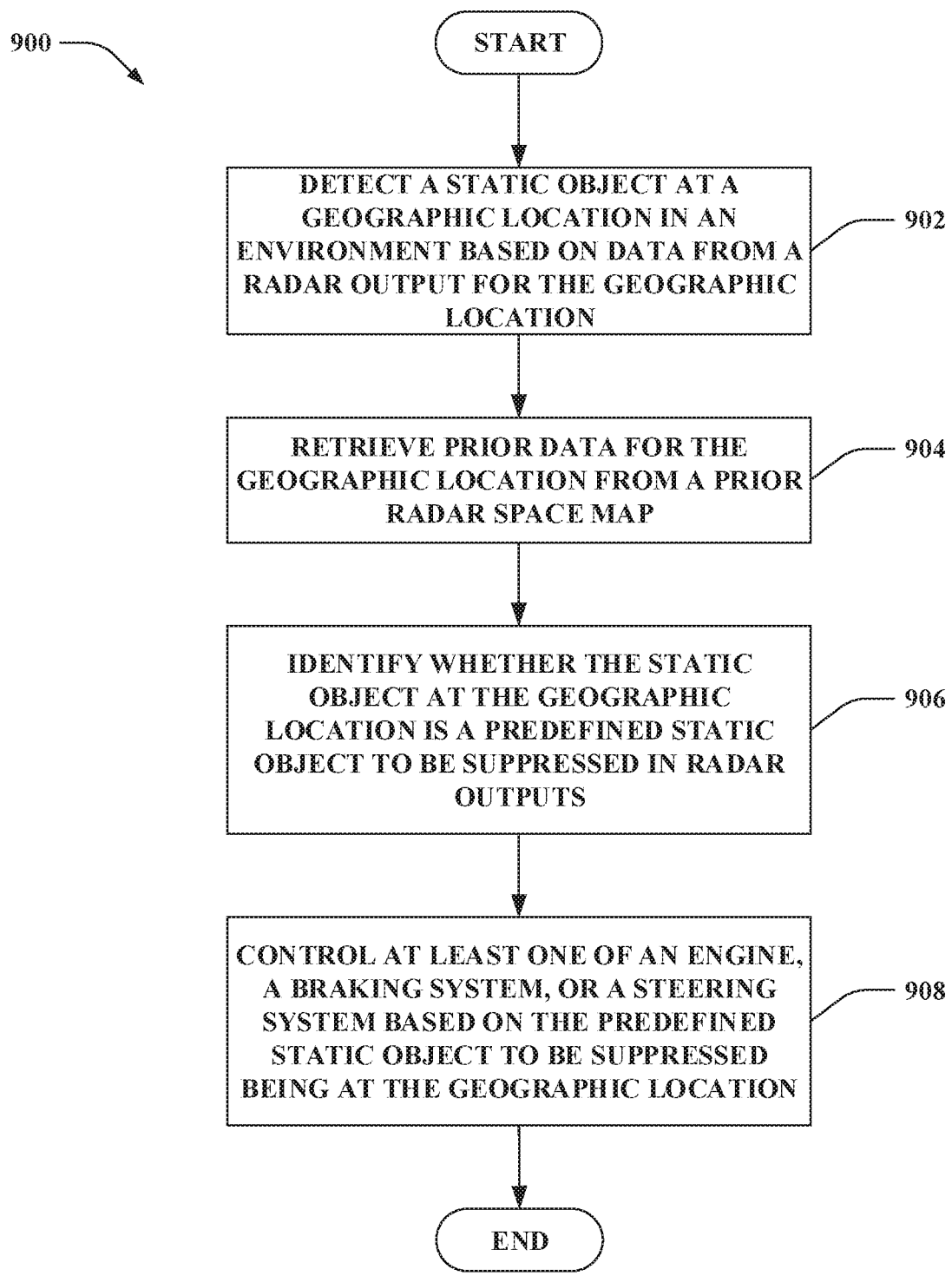
FIG. 9 is a flow diagram that illustrates an exemplary methodology for controlling behavior of an autonomous vehicle based on prior data for geographic locations corresponding to predefined static objects in a prior radar space map.

FIGS. 8-9 illustrate exemplary methodologies relating to controlling an autonomous vehicle utilizing a prior radar space map that includes prior data for geographic locations in an environment corresponding to whether predefined static objects to be suppressed in radar outputs are located at the geographic locations. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein. Accordingly, the autonomous vehicle 100 can be controlled to improve a view by mitigating occlusion caused by predefined static object(s) to be suppressed in radar outputs specified in the prior radar space map 120.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 8 illustrates a methodology 800 for controlling an autonomous vehicle to suppress data corresponding to predefined static objects in radar outputs generated by a radar sensor system of the autonomous vehicle. At 802, prior data for a geographic location in an environment can be retrieved from a prior radar space map. The prior radar space map includes prior data for geographic locations in the environment corresponding to whether predefined static objects to be suppressed in radar outputs are located at the geographic locations. At 804, a score representative of a likelihood of a tracked object being at the geographic location can be generated. The score can be generated based on data from a radar output for the geographic location generated by the radar sensor system of the autonomous vehicle, data from a second output for the geographic location generated by a second sensor system of the autonomous vehicle, and the prior data for the geographic location from the prior radar space map. The second sensor system is a differing type of sensor system as compared to the radar sensor system (e.g., a lidar sensor system, an image sensor system). Moreover, it is contemplated that data from a third output for the geographic location generated by a third sensor system of the autonomous vehicle can also be used to generate the score; the third sensor system can be a differing type of sensor system as compared to the radar sensor system and the second sensor system. At 806, at least one of an engine of the autonomous vehicle, a braking system of the autonomous vehicle, or a steering system of the autonomous vehicle can be controlled based upon the score representative of the likelihood of the tracked object being at the geographic location.

Turning to FIG. 9, illustrated is a methodology 900 for controlling behavior of an autonomous vehicle based on prior data for geographic locations corresponding to predefined static objects in a prior radar space map. At 902, a static object can be detected at a geographic location in an environment based on data from a radar output for the geographic location. For instance, the radar output can be received from a radar sensor system of the autonomous vehicle. Moreover, a portion of a field of view of the radar sensor system beyond the geographic location from a perspective of the radar sensor system can be occluded due to the static object. At 904, prior data for the geographic location can be retrieved from the prior radar space map. The prior radar space map can include prior data for geographic locations in the environment corresponding to whether predefined static objects to be suppressed in radar outputs are located at the geographic locations. At 906, a determination can be made concerning whether the static object at the geographic location is a predefined static object to be suppressed in the radar outputs. For instance, based on the prior data for the geographic location from the prior radar space map, the static object at the geographic location can be identified as a predefined static object to be suppressed in the radar outputs. At 908, at least one of an engine of the autonomous vehicle, a braking system of the autonomous vehicle, or a steering system of the autonomous vehicle can be controlled based on the predefined static object to be suppressed being at the geographic location. For example, the autonomous vehicle can be repositioned based on occlusion in the field of view of the radar sensor system caused by the predefined static object to be suppressed.

Figure 10:
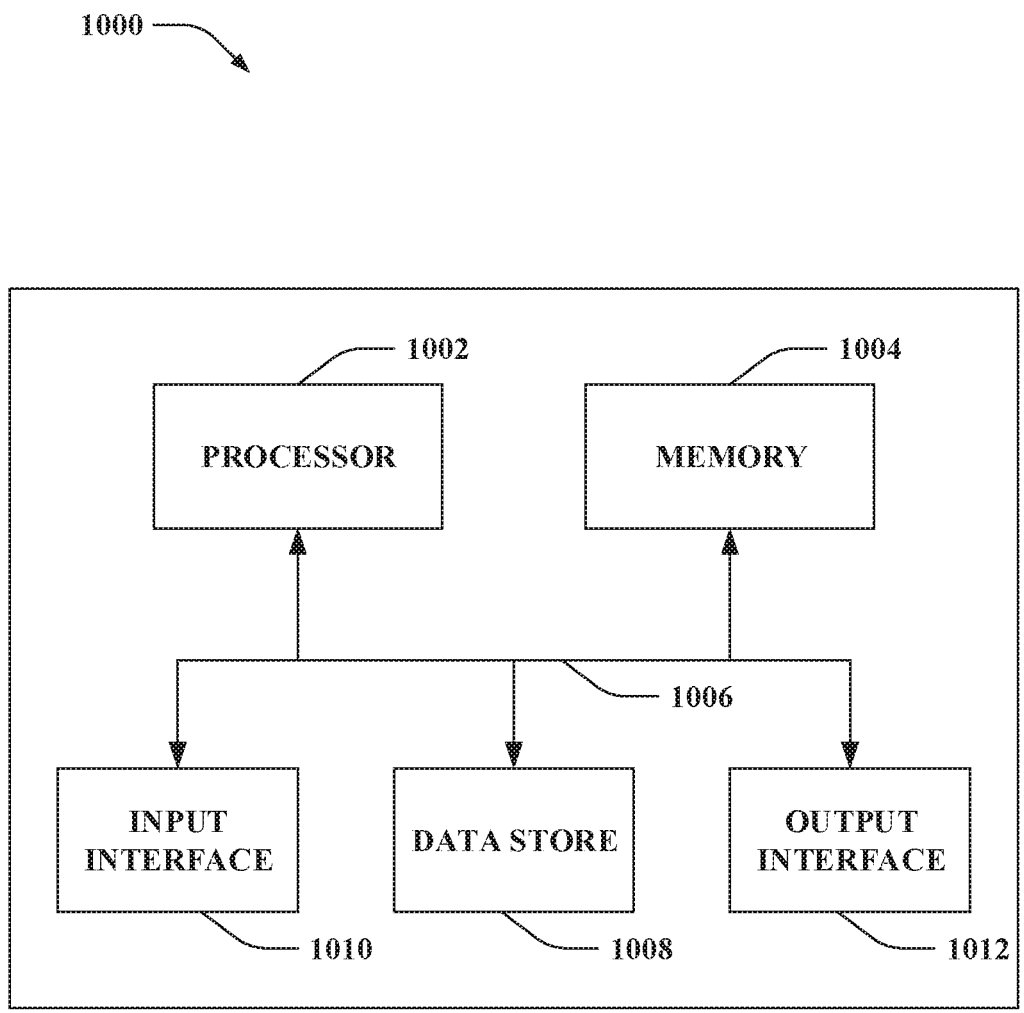
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be or include the computing system 112. The computing device 1000 includes at least one processor 1002 (e.g., the processor 114) that executes instructions that are stored in a memory 1004 (e.g., the memory 116). The instructions may be, for instance, instructions for implementing functionality described as being carried out by one or more systems discussed above or instructions for implementing one or more of the methods described above. The processor 1002 may be a GPU, a plurality of GPUs, a CPU, a plurality of CPUs, a multi-core processor, etc. The processor 1002 may access the memory 1004 by way of a system bus 1006. In addition to storing executable instructions, the memory 1004 may also store sensor system outputs (e.g., the radar output 202, the lidar output 204, the image output 206), scores generated by the object detection system 122 (e.g., the score 208), the prior radar space map 120, and so forth.

The computing device 1000 additionally includes a data store 1008 (e.g., the data store 118) that is accessible by the processor 1002 by way of the system bus 1006. The data store 1008 may include executable instructions, sensor system outputs (e.g., the radar output 202, the lidar output 204, the image output 206), scores generated by the object detection system 122 (e.g., the score 208), the prior radar space map 120, etc. The computing device 1000 also includes an input interface 1010 that allows external devices to communicate with the computing device 1000. For instance, the input interface 1010 may be used to receive instructions from an external computer device, etc. The computing device 1000 also includes an output interface 1012 that interfaces the computing device 1000 with one or more external devices. For example, the computing device 1000 may transmit control signals to the engine 106, the braking system 108, and/or the steering system 110 by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   an engine;
   a braking system;
   a steering system;
   a radar sensor system that generates a radar output;
   a second sensor system that generates a second output, the second sensor system being a differing type of sensor system as compared to the radar sensor system; and
   a computing system that is in communication with the engine, the braking system, the steering system, the radar sensor system, and the second sensor system, wherein the computing system comprises:
   a processor; and
   memory that stores computer-executable instructions that, when executed by the processor, cause the processor to perform acts comprising:
      detecting a static object at a geographic location in an environment based on data from the radar output for the geographic location;
      retrieving prior data for geographic location in the environment from a prior radar space map, the prior radar space map comprises prior data for geographic locations in the environment corresponding to whether predefined static objects to be suppressed in radar outputs are located at the geographic locations;
      generating a score representative of a likelihood of a tracked object being at the geographic location based on the data from the radar output for the geographic location, data from the second output for the geographic location, and the prior data for the geographic location, wherein the data from the radar output for the geographic location corresponding to the static object is selectively suppressed for generating the score representative of the likelihood of the tracked object being at the geographic location based on whether the static object is a predefined static object to be suppressed as specified by the prior data for the geographic location; and
      controlling at least one of the engine, the braking system, or the steering system based upon the score representative of the likelihood of the tracked object being at the geographic location.

2. The autonomous vehicle of claim 1, wherein the second sensor system is a lidar sensor system.

3. The autonomous vehicle of claim 1, wherein the second sensor system is an image sensor system.

4. The autonomous vehicle of claim 1, further comprising:
   a third sensor system that generates a third output, the third sensor system being a differing type of sensor system as compared to the radar sensor system and the second sensor system;
   wherein the score is further generated based on data from the third output for the geographic location.

5. The autonomous vehicle of claim 1, wherein the predefined static objects to be suppressed in the radar outputs comprise manhole covers.

6. The autonomous vehicle of claim 1, wherein the predefined static objects to be suppressed in the radar outputs comprise metallic plates and metallic grates.

7. The autonomous vehicle of claim 1, wherein the predefined static objects to be suppressed in the radar outputs comprise supporting structures of bridge overpasses.

8. The autonomous vehicle of claim 1, wherein:
   when a static object is not detected at a differing geographic location based on data from the radar output for the differing geographic location:
      prior data for the differing geographic location is not retrieved from the prior radar space map; and
      a differing score representative of a likelihood of a tracked object being at the differing geographic location is generated based on the data from the radar output for the differing geographic location and data from the second output for the differing geographic location without the prior data for the differing geographic location from the prior radar space map.

9. The autonomous vehicle of claim 1, wherein the score is generated utilizing a Bayesian system.

10. The autonomous vehicle of claim 1, wherein the tracked object is one of a car, a truck, or a bus.

11. The autonomous vehicle of claim 1, wherein a portion of a field of view of the radar sensor system beyond the geographic location at which the static object is detected is occluded from a perspective of the radar sensor system due to the static object, and wherein the memory further stores computer-executable instructions that, when executed by the processor, cause the processor to perform acts comprising:
   identifying, based on the score representative of the likelihood of the tracked object being at the geographic location, that the static object at the geographic location is the predefined static object to be suppressed in the radar outputs;
   wherein controlling the at least one of the engine, the braking system, or the steering system based upon the score representative of the likelihood of the tracked object being at the geographic location further comprises controlling the at least one of the engine, the braking system, or the steering system based on the predefined static object to be suppressed being at the geographic location.

12. The autonomous vehicle of claim 11, wherein the at least one of the engine, the braking system, or the steering system are controlled to reposition the autonomous vehicle based on occlusion in the field of view of the radar sensor system caused by the predefined static object to be suppressed such that the portion of the field of view occluded by the predefined static object becomes viewable by the radar sensor system when the autonomous vehicle is repositioned.

13. The autonomous vehicle of claim 1, wherein the predefined static objects to be suppressed in the radar outputs are passable by vehicles one of over or under without impeding the vehicles.

14. A method performed by an autonomous vehicle, the method comprising:
   receiving a radar output generated by a radar sensor system of the autonomous vehicle;
   detecting a static object at a geographic location in an environment based on data from the radar output for the geographic location, wherein a portion of a field of view of the radar sensor system beyond the geographic location from a perspective of the radar sensor system is occluded due to the static object;
   retrieving prior data for the geographic location from a prior radar space map, the prior radar space map comprises prior data for geographic locations in the environment corresponding to whether predefined static objects to be suppressed in radar outputs are located at the geographic locations;
   identifying, based on the prior data for the geographic location from the prior radar space map, that the static object at the geographic location is a predefined static object to be suppressed in the radar outputs; and
   controlling at least one of an engine of the autonomous vehicle, a braking system of the autonomous vehicle, or a steering system of the autonomous vehicle based on the predefined static object to be suppressed being at the geographic location.

15. The method of claim 14, wherein the at least one of the engine, the braking system, or the steering system are controlled to reposition the autonomous vehicle based on occlusion in the field of view of the radar sensor system caused by the predefined static object to be suppressed.

16. The method of claim 14, wherein the at least one of the engine, the braking system, or the steering system are controlled to reposition the autonomous vehicle such that the predefined static object to be suppressed at the geographic location is removed from the field of view of the radar sensor system.

17. The method of claim 14, further comprising:
   receiving a second output generated by a second sensor system of the autonomous vehicle, the second sensor system being a different type of sensor system as compared to the radar sensor system; and
   generating a score representative of a likelihood of a tracked object being at the geographic location, the score being generated based on the data from the radar output for the geographic location, data from the second output for the geographic location, and the prior data for the geographic location, wherein the data from the radar output for the geographic location corresponding to the static object is selectively suppressed for generating the score representative of the likelihood of the tracked object being at the geographic location based on whether the static object is a predefined static object to be suppressed as specified by the prior data for the geographic location.

18. The method of claim 17, wherein the second sensor system is one of a lidar sensor system or an image sensor system.

19. The method of claim 14, wherein the predefined static objects to be suppressed in the radar outputs comprise at least one of:
   manhole covers;
   metallic plates;
   metallic grates; or
   supporting structures of bridge overpasses.

20. An autonomous vehicle, comprising:
   a computer-readable storage medium that comprises instructions that, when executed by one of more processors, cause the one or more processors to perform actions comprising:
      detecting a static object at a geographic location in an environment based on data from a radar output for the geographic location, the radar output being generated by a radar sensor system of the autonomous vehicle;
      retrieving prior data for the geographic location from a prior radar space map, the prior radar space map comprises prior data for geographic locations in the environment corresponding to whether predefined static objects to be suppressed in radar outputs are located at the geographic locations;
      generating a score representative of a likelihood of a tracked object being at the geographic location, the score being generated based on the data from the radar output for the geographic location, data from a second output for the geographic location, and the prior data for the geographic location, wherein the second output is generated by a second sensor system of the autonomous vehicle, the second sensor system is a different type of sensor system as compared to the radar sensor system, and the data from the radar output for the geographic location corresponding to the static object is selectively suppressed for generating the score representative of the likelihood of the tracked object being at the geographic location based on whether the static object is a predefined static object to be suppressed as specified by the prior data for the geographic location; and
controlling at least one of the engine, the braking system, or the steering system based upon the score representative of the likelihood of the tracked object being at the geographic location.

\* \* \* \* \*